March 5, 1935. C. L. BRACKETT 1,993,474
HANDLING MECHANISM FOR INDIVIDUAL ELEMENTS
Filed Jan. 16, 1931 2 Sheets-Sheet 2
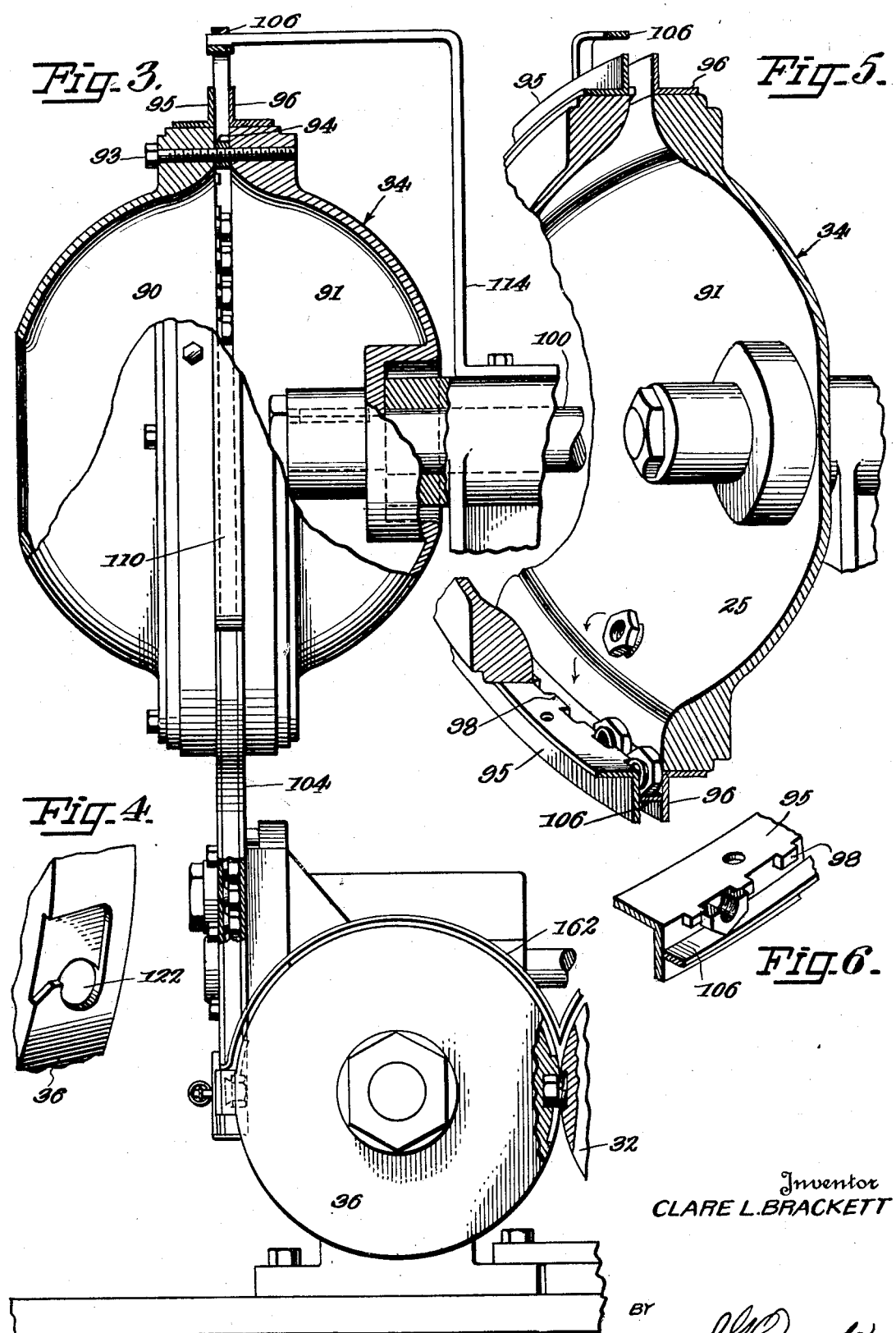
Inventor
CLARE L. BRACKETT
BY
Attorney Patented Mar. 5, 1935

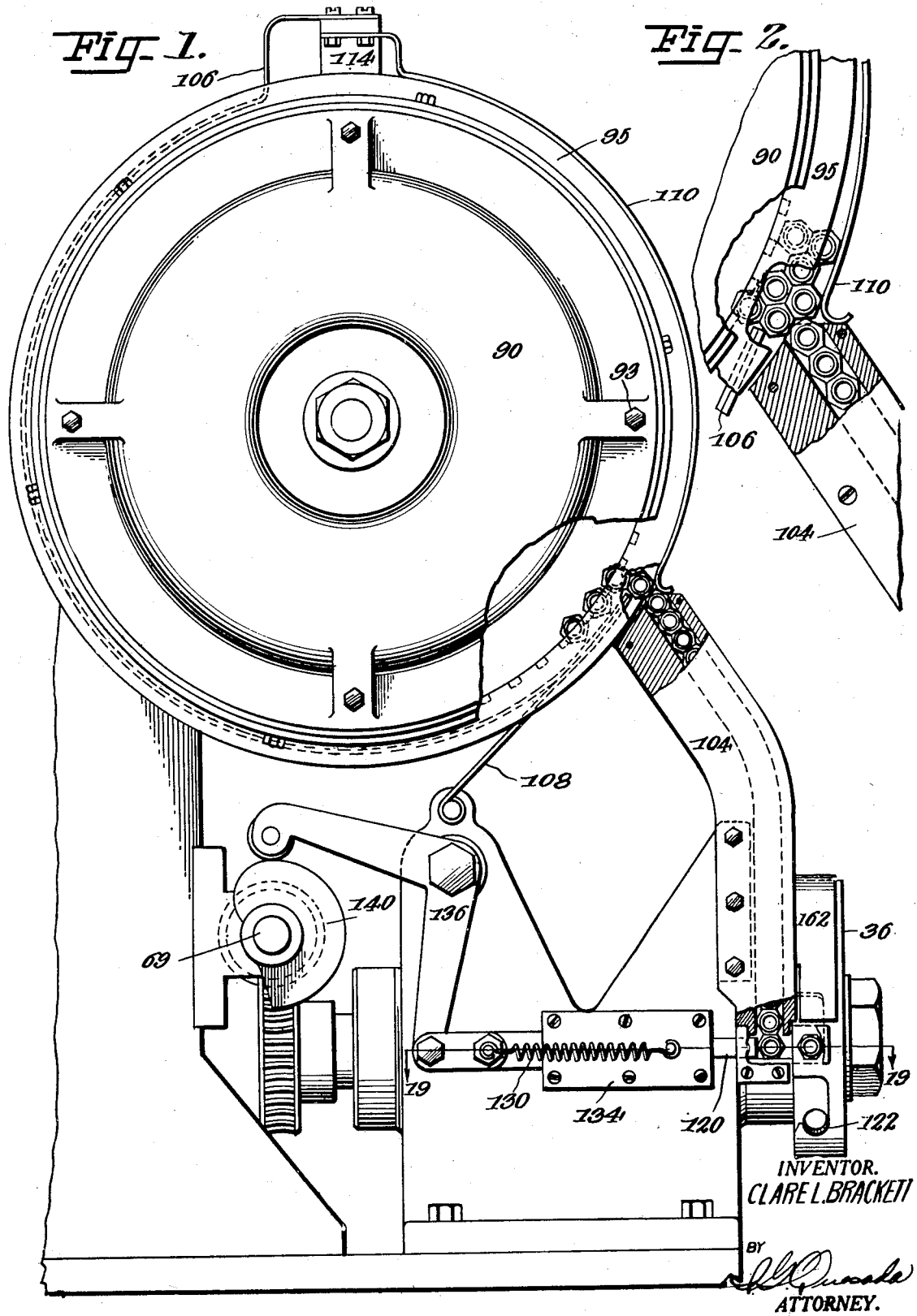

1,993,474

UNITED STATES PATENT OFFICE 1,993,474

HANDLING MECHANISM FOR INDIVIDUAL ELEMENTS

Clare L. Brackett, Detroit, Mich., assignor to National Machine Products Company, Detroit, Mich., a corporation of Michigan Application January 16, 1931, Serial No. 509,259

6 Claims. (Cl. 10—170)

The nuts or other elements intended for handling with the mechanism forming the subject of this invention are formed with axial skirts by which the nuts and washers are coupled and thus, as an important part of the invention, there will be found means by which the nuts are arranged with the skirts thereof all pointing in the proper direction for subsequent presentation to the washers, there also being means by which an oversupply of nuts from the nut hopper to the nut magazine will result in the temporary return of the previously arranged nuts to the hopper for later delivery to the magazine.

Other objects and advantages will be apparent during the course of the following description.

In the accompanying drawings forming a part of this application and in which like numerals are employed to designate like parts throughout the same, Figure 1 is a fragmentary side elevation of an element handling mechanism embodied in the invention, parts being broken away.

Figure 2 is an enlarged fragmentary side elevation illustrating the relation between the nut hopper and the magazine and the means by which an over-supply of nuts from the hopper to the magazine is compensated for.

Figure 3 is a fragmentary side elevation illustrating a coupling mechanism together with a nut hopper and associated parts, parts being shown broken away.

Figure 4 is a fragmentary perspective of a nut carrying disc embodied in the invention.

Figure 5 is a fragmentary sectional perspective of a nut hopper embodied in the invention.

Figure 6 is a fragmentary sectional perspective illustrating the means by which nuts are arranged with the coupling skirts thereof all pointing in the same direction for subsequent presentation to washers.

Attention is invited to the drawings and particularly to Figure 3 in which it is illustrated that a nut hopper 34 is rotatably mounted and embodies two more or less semispherical complemental sections 90 and 91 joined by a suitable number of spaced cap screws 93 or other connecting devices, there being spacing collars 94 mounted on the cap screws to space the sections the distance required for the edgewise passage of the nuts placed within the hopper. Since it is a simple matter to provide a spacing collar 94 of a greater or less length, it will be recognized that the nut handling mechanism may be readily adapted to nuts of various sizes.

Figures 3, 4 and 5 illustrate that the adjacent portions of the hopper sections 90 and 91 are somewhat in the nature of annular flanges or rims having the opposed walls thereof more or less parallel to define an annular outlet passage for nuts, the walls of the body portions of the sections 90 and 91 being curved to merge easily into the side walls of the channel thus formed.

The annular outlet between the opposed portions of the hopper sections 90 and 91 is circumscribed by a culling or selecting mechanism comprising L-shaped annuli 95 and 96 having the base flanges thereof detachably secured to the rims of the hopper sections 90 and 91, respectively.

By reference to Figures 5 and 6, it will be seen that the culling or selecting ring 95 has the inner wall thereof provided with uniformly spaced lugs 98 defining intervening radial passages of sufficient width to allow of the movement therethrough of the skirts of the nuts while of insufficient width to allow of the movement therethrough of the bodies of the nuts. It is illustrated in various figures of the drawings that the skirts of the nuts extend from the base surfaces of the nuts and are substantially less in outside diameter than the outside diameter of the nuts so that the limited and predetermined dimensions of the spaces between the lugs 98 will allow the passage of only the skirts of the nuts. Thus, the culling mechanism comprising the annuli 95 and 96 will allow of the discharge of only those nuts that have the skirts thereof presented in the direction of the hopper section 90 and will confine to the hopper those nuts in which the skirts thereof are pointed toward the section 91.

The hopper 34 is mounted horizontally and is rotated about a horizontal axis through a drive shaft 100 so that the nuts placed within the hopper are turbulated and directed toward the culling mechanism with the result that the nuts that are properly presented to the culling mechanism are allowed to pass while the others will remain within the hopper until such time as the same are properly presented to the culling mechanism.

As illustrated in Figures 1 and 3, the parallel side walls of the culling rings 95 and 96 define an annular nut passage in the plane of the nut magazine 104 and having constant communication therewith to furnish nuts thereto. The nuts that are allowed to pass between the lugs 98 are confined in the annular nut passage by an arcuate leaf spring 106 extending a substantial distance about the periphery of the rotary hopper 34. More specifically, the retaining spring 106 extends between the radial parallel side walls of the culling rings 95 and 96 and has what might be said to be the lower end thereof joined in any suitable manner to an anchoring and tensioning device 108. The tensioning device 108 allows the body of the spring 106 and particularly the lower portion thereof to move outward a limited extent to permit of the free transfer of previously arranged nuts into the magazine 104.

A second leaf spring 110 is arranged between or at the outer edges of the spaced parallel side walls of the culling rings 95 and 96 and has the outer or lower portion thereof free so that the body of the spring may move outwardly as shown in Figure 2 in response to an oversupply of nuts to the magazine. When the culling mechanism allows of the passage of more nuts than can be accommodated in the magazine 104, the nuts will back up into the space immediately above the magazine and will be returned to the hopper for later presentation to the magazine. Since the nuts are all properly arranged upon their exit from the hopper the return of the nuts to the hopper while so arranged is a very simple matter. The upper portions of the springs 106 and 110 are offset and are attached to opposite surfaces of a fixed bracket 114 or to any other supporting means.

Referring now to Figure 1 it will be seen that the outlet of the magazine 104 is intersected by a horizontally movable plunger 120 through the medium of which the nuts are transferred individually from the magazine to an associated nut carrier 36. More specifically, the nut carrier 36 is shown to be in the nature of a disc having peripheral sockets 122 opening out through the magazine side of the disc for registration with the outlet from the magazine. When the sockets are thus registered with the outlet from the magazine, the plunger 120 is advanced to bring about the lateral movement of the nuts from the magazine into the sockets. The disc 36 is associated with a second disc 32, the latter disc being provided with peripheral sockets mating with the sockets 122 and adapted for the reception of washers intended for connection with the nuts carried by the disc 36.

The plunger 120 is advanced into engagement with the nuts by a contractile coil spring 130, one end of which is anchored to the plunger guide 134, while the other end thereof is anchored to what might be said to be the rear portion of the plunger 120.

The rear portion of the plunger 120 also has connection with the lower branch of a bell crank 136 while the upper or nearly horizontal branch of the bell crank is provided with a roller riding on the lobe of a cam 140. Obviously, the rotation of the cam 140 will intermittently rock the bell crank 136 to retract the plunger 120 and when the lobe of the cam 140 rides beyond the roller of the bell crank 136, the spring 130 will be allowed to contract and thereby advance the plunger 120 for the transfer of the adjacent nut from the magazine to the nut carrier.

By reference to Figure 1, it will be seen that the cam 140 is mounted upon a driven shaft 69.

Referring now to the actual coupling of the washers and nuts, attention is invited to Figure 3 illustrating that as a result of rotation of the disc 32 in a counterclockwise direction and turning of the disc 36 in a clockwise direction, in synchronism of course, the washers and nuts will be brought to a tangency so that the skirts of the nuts are caused to wedge between the inner side walls of the washers and spread the same and continued turning of the discs 32 and 36 will complete the union of the washers and nuts. Any suitable means may be provided below the coupling discs to receive the coupled nuts and washers.

Figure 3 illustrates that suitable retaining means 162 may be positioned above the discs 32 and 36 to hold the washers and the nuts in place while being conducted from the loading to the coupling positions. The retaining means 162 may be in the nature of simple arcuate strips held in place in any manner found expedient.

Having thus described the invention, what is claimed is:

1. In a mechanism for handling nuts having diametrically restricted end portions, a hopper having a movable culling mechanism embodying spaced lugs defining intervening passages for diametrically restricted portions of nuts, a yieldable retainer arranged outwardly of said lugs for holding nuts, and a second yieldable retainer associated with said culling mechanism at a point beyond said first retainer and having means cooperating with the culling mechanism in handling and returning to the hopper an excess number of nuts passed through the culling mechanism.

2. In a mechanism for handling skirted nuts, a rotatable hopper embodying spaced sections defining an annular outlet for skirted nuts, a culling mechanism circumscribing said outlet and embodying spaced annuli, one of said annuli being provided with spaced lugs defining intervening passages for the selective exit of skirted nuts from the hopper.

3. In a mechanism for handling skirted nuts, a rotatable hopper embodying spaced sections defining an annular outlet for skirted nuts, a culling mechanism circumscribing said outlet and embodying spaced annuli, one of said annuli being provided with spaced lugs defining intervening passages for the selective exit of skirted nuts from the hopper, and yieldable means cooperating with said spaced annuli in holding in position the nuts passed through said culling mechanism.

4. In a mechanism for handling skirted nuts, a hopper, a rotatable culling mechanism associated with the hopper and bearing a pair of arcuate sections having opposed surfaces, one of said surfaces being provided with spaced means defining intervening passages for the movement therethrough of the skirts of the nuts, said passages being of widths less than the diameters of the bodies of the nuts to exclude the bodies of the nuts from passage between said means, and a yieldable holder movable between said surfaces outward of said passages.

5. In a mechanism for handling skirted nuts, a hopper having an outlet, a rotatable culling mechanism circumscribing said outlet and embodying spaced annuli defining a passage for nuts, and yieldable means movable between and cooperating with said spaced annuli in holding in position the nuts passed through said culling mechanism, said annuli being radially positioned in guiding relation to said yieldable means.

6. In a mechanism for handling skirted nuts, a rotatable hopper having an outlet, a culling mechanism circumscribing said outlet and embodying spaced annuli defining a passage for nuts, and yieldable means cooperating with said spaced annuli in holding in position the nuts passed through said culling mechanism, said yieldable means embodying a leaf spring element positioned between said annuli and guided thereby.

CLARE L. BRACKETT.